United States Patent [19]

Sarosy et al.

[11] 3,954,016

[45] May 4, 1976

[54] DOOR LOCK ACTUATOR

[75] Inventors: Edmund F. Sarosy, Birmingham; Bert R. Wanlass, Warren, both of Mich.

[73] Assignee: General Motors Corporation, Detroit, Mich.

[22] Filed: Nov. 27, 1974

[21] Appl. No.: 527,690

[52] U.S. Cl. .......................................... 74/29; 74/422

[51] Int. Cl.$^2$ .......................................... F16H 19/04

[58] Field of Search .......... 74/30, 29, 117, 424.8 A, 74/422

[56] References Cited

UNITED STATES PATENTS

| | | | |
|---|---|---|---|
| 1,316,437 | 9/1919 | Flood | 74/30 |
| 2,204,514 | 6/1940 | Schlote | 74/117 |
| 2,476,154 | 7/1949 | Lohs | 74/29 |
| 2,806,689 | 9/1957 | Miller | 74/422 |
| 2,876,652 | 3/1959 | Pankonin | 74/422 |
| 3,730,008 | 5/1973 | Sheesley | 74/424.8 A |
| 3,771,781 | 11/1973 | Lackey | 74/422 |
| R24,883 | 10/1960 | Herr | 74/30 |

*Primary Examiner*—Samuel Scott
*Assistant Examiner*—Wesley S. Ratliff, Jr.
*Attorney, Agent, or Firm*—Donald F. Scherer

[57] ABSTRACT

A door lock actuator for locking and unlocking a vehicle door includes a rack and pinion drive assembly which is laterally movable to move the door lock control member between locking and unlocking positions as driven by a passenger controlled permanent magnet electric motor.

4 Claims, 5 Drawing Figures

DOOR LOCK ACTUATOR

The present invention relates to powered door lock mechanisms and, in particular, to a compact, low cost, permanent magnet motor powered rack and pinion drive actuator for locking and unlocking the doors of a motor vehicle.

Recently, it has been proposed to eliminate bulky and expensive solenoid and vacuum motor powered door lock actuator mechanisms, with electric drive locking devices. Such proposals have taken the form of a permanent magnet electric motor which is coupled to the door lock control member by means of a ball screw or sector gear drive arrangement. Such units themselves are somewhat bulky and are not easily unitized or mounted in existing door structures.

A power door lock actuator in accordance with the present invention, however, provides a compact unitized motor and actuator assembly which is formed of lightweight materials and readily mounted within existing door structures. Therein output piston operatively connected to the door lock control member is slidably retained within a plastic housing on which the permanent electric motor is mounted and which in turn is secured to the vehicle door structure by an adapter bracket. The output piston has a longitudinal slot having a rack formed along one anterior surface thereof. The pinion connected to the motor output shaft operatively engages the rack and upon actuation of the passenger controlled switch drives the output piston between extremes of movement permitted by the rack. The movement is sufficient to lock and unlock the door locking mechanism. A guide roller engages the opposed surface of the piston opposite the pinion which maintains driving engagement and guides the piston during its movement. At the extremes of movement, piston engages resilient bumpers and the motor stalls regardless of switch position.

The above and other features of the present invention will be apparent to one skilled in the art upon reading the following detailed description, reference being made to the accompanying drawings illustrating the preferred embodiment of the present invention in which.

Figure 1:
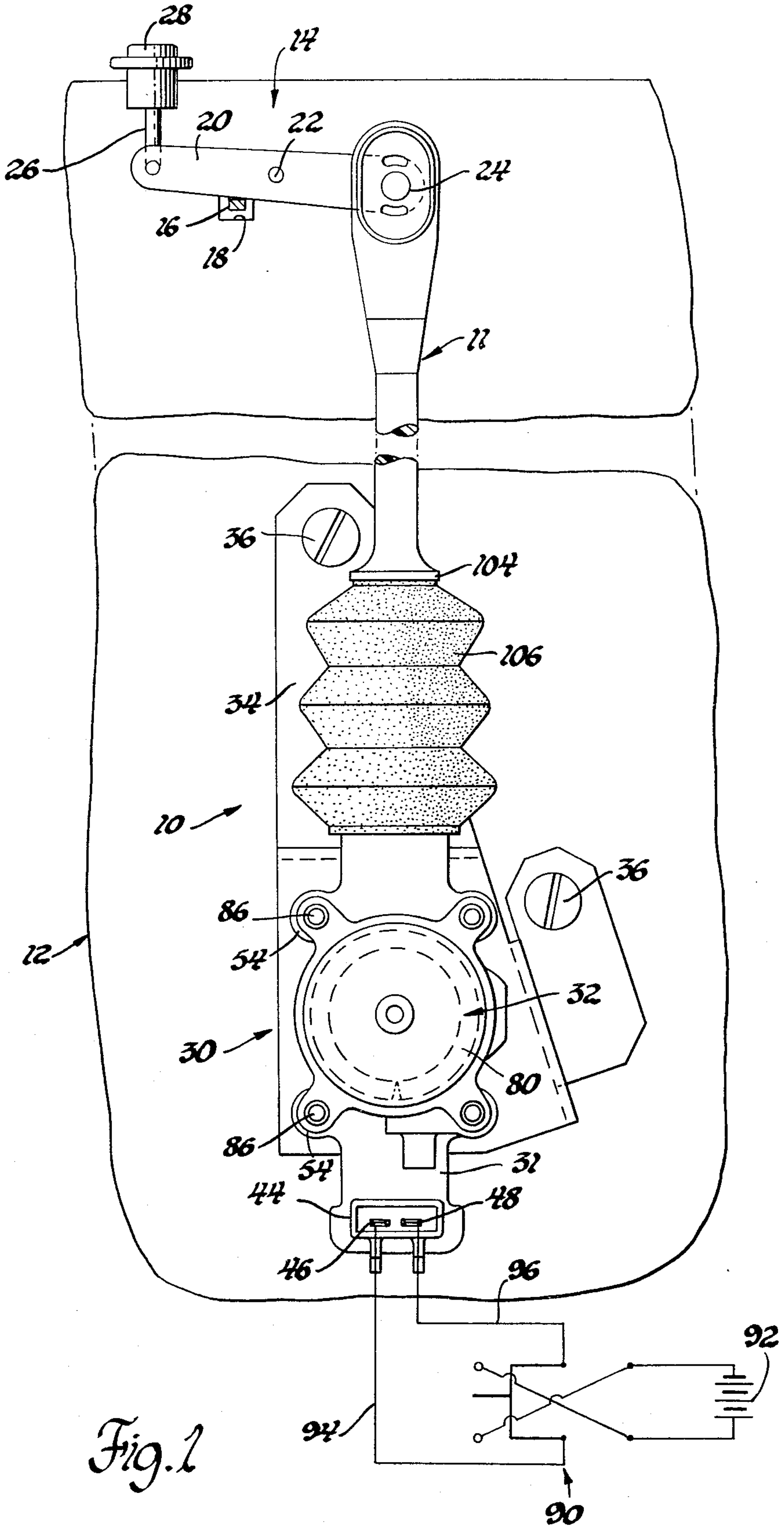
FIG. 1 is a side elevational view of a powered door lock actuator assembly made in accordance with the present invention and showing the schematic operative connections of the door lock latch mechanism.
Figure 2:
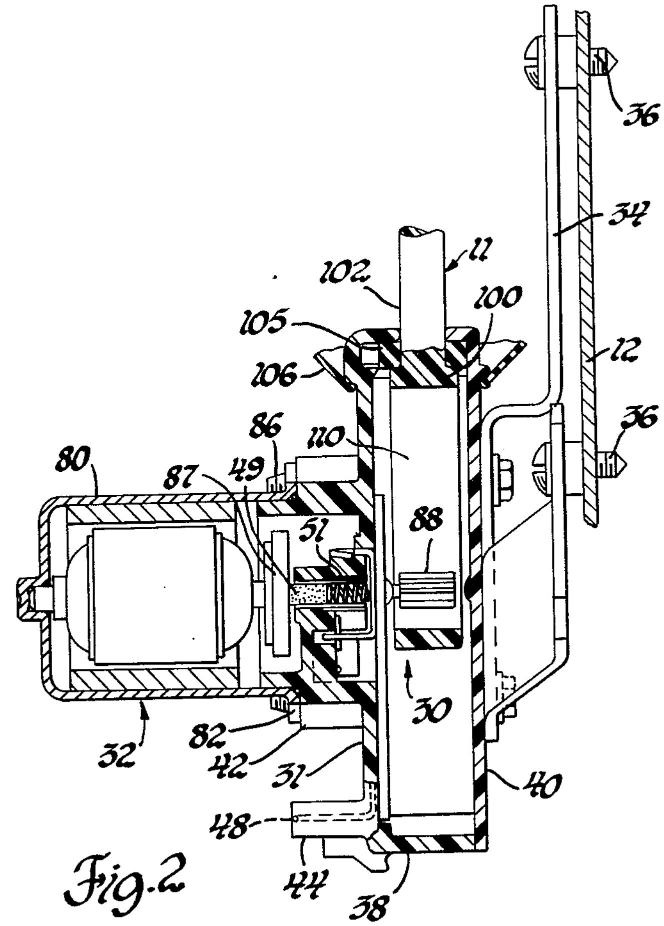
FIG. 2 is a side cross sectional view showing details of the construction of the rack and pinion drive with an output piston being in the extended latch position.

Referring to FIG. 1 there is shown a power door lock actuator assembly 10 made in accordance with the present invention which is mounted on a motor vehicle door 12. An output member 11 of the actuator assembly 10 is connected to a schematically illustrated, actuating mechanism 14. By operation of the actuator assembly, the locking mechanism is moved between locked and unlocked position to latch and unlatch a conventional door locking mechanism, not shown.

In the present invention the door locking mechanism is controlled by an actuating arm 16 which is vertically reciprocable in a slot 18. The pivot 16 is normally biased upwardly in a position thereof that is controlled by a lever 20 which is intermediately pivotally connected to the door 12 at a pin connection 22. One end of the lever 20 is pivotally connected to the output member of the actuator assembly 10 as a pivot connection 24. The other end of the lever 20 is pivotally connected to a rod 26 on which the manually operated push button 28 is secured at its upper end. Button 28 conventionally projects in the passenger compartment adjacent the window and is manually extended or depressed to pviot lever so as to appropriately actuate the arm 16 for locking or unlocking the door latch mechanism. In the position shown, the button 28 is in the compressed position and actuator assembly and door lock mechanism are in latched position.

The door lock assembly comprises a linear rack and pinion actuator 30, located in a housing 31, operated by a permanent magnet electric motor 32 and mounted on a bracket 34 and secured to the door panel 12 by self tapping screws 36.

Figure 3:
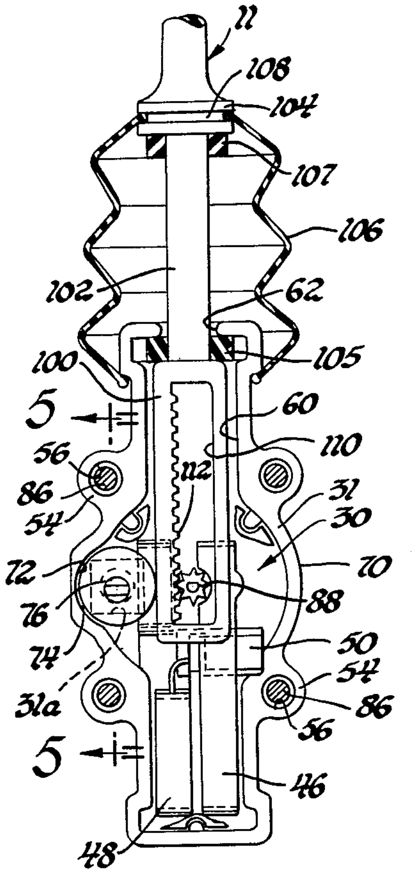
FIG. 3 is a rear elevational view of the rack and pinion drive assembly with the housing cover removed and showing the output piston in the extended latch position.
Figure 4:
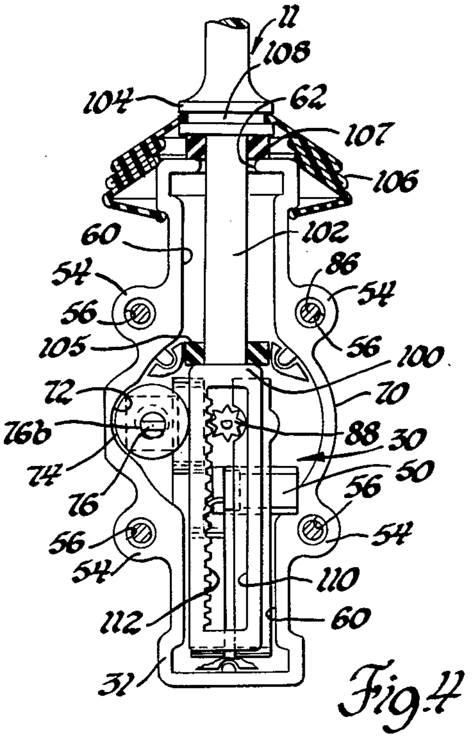
FIG. 4 is a view similar to FIG. 3 showing the output piston in the retracted unlatched position.

The housing 31 is formed of a suitable plastic material and comprises a base section 38 and a lid 40. Base section 38 is provided with rearwardly extending hub section 42 and a terminal block 44. A pair of terminals 46, 48 extend rearwardly along the block 44 and upwardly internally thereof for electrical connection with spring biased brush assemblies 49. As shown in FIG. 3 the terminal 48 is shorter than the terminal 46 and is electrically connected to the circuit breaker 50 which is then connected to the respective brush assemblies 49. Brush assemblies 49 are located within a pair of radially spaced axially extending passages 51 in the hub section 42.

The hub section 42 is provided with four lateral bosses 54 having apertures 56 therethrough. The base section 38 is provided with a longitudinal generally rectangular shaped guide channel 60 with an upper opening 62. The hub section 42 has a generally circular center section 70 having a concave recess 72 formed in one side thereof. A guide roller 74 is rotatably mounted on a post 76 in the recess 72.

The electric motor 32 includes a casing 80 having an outwardly turned annular flange 82 which is fixedly attached to the housing by means of four screws 86 extending through the mounting bosses 54 threaded through the flange 82. The motor 32 is a conventional permanent magnet type and includes a commutator 87 carried on the armature shaft of the motor. The shaft of the motor extends through a guide passage not shown to the interior of channel 60 and carries at its outer end a pinion 88. The motor is controlled by four pole double-throw switch 90 positioned in the passenger compartment within access of the vehicle operator. The switch is electrically connected to a source of electrical power such as a vehicle battery 92. The center contacts of the switch 90 are respectfully connected to terminals 46 and 48 through leads 94 and 96. The switch is normally biased to the neutral position and by movement in one direction or the other the polarity to the armature can be changed to reverse rotation of the armature and the pinion 88. The output member 11 includes a rack section 100 slidably disposed in the channel 60 and a cylindrical piston rod 102 projecting outwardly therefrom through opening 62. The piston rod 102, as shown in FIG. 3, includes an enlarged head section

104.

Figure 5:
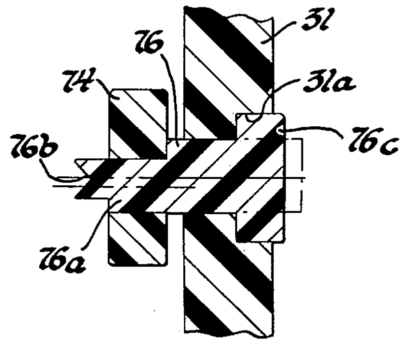
FIG. 5 is a cross sectional view taken along line 5—5 in FIG. 3.

A pair of resilient bumpers 105 and 107 are positioned encircling the piston rod 102. Bumper 105 is disposed within the channel 60 while bumper 107 is disposed adjacent the head section 104. An elastomeric expandable bellows 106 extends between the upper end section of the housing 31 and a groove 108 formed in the head section 104. The bellows 106 axially expands and contracts as the piston moves between an extended and retracted position to seal the opening 62 from the environment. The rack section 100 includes a longitudinal slot 110 having rack gear teeth 112 formed along one longitudinal inner surface thereof. The teeth 112 are in meshing engagement with the teeth of the pinion 88. The guide roller 74 engages the outer surface of the rack section 100 opposite the pinion to guide the rack section 100 during its movement when driven by the pinion 88. As seen in FIG. 5, the roller 74 may be adjusted at final assembly such that the teeth of pinion 88 and the teeth 112 of rack section 100 are in proper engagement. To effect this alignment, the roller 74 is rotatably positioned on an eccentric 76*a* formed on the post 76. The post 76 also has a slot 76*b* which permits the post 76 to be manually rotated in the housing 31 with a tool such as a screwdriver. As the post 76 is rotated, the roller 74, due to the cam action of eccentric 76*a*, will move the rack section 100 to the proper position relative to the pinion 88. When the rack section 100 is in the proper position, the end 76*c* of post 76 may be heat staked into a square opening 31*a* formed in the housing 31. Prior to heat staking, the diameter of post 76 is constant as it passes through housing 31, as shown in phantom lines. This permits simple assembly, adjustment and final location of the rack and pinion components during final assembly of the actuator mechanism.

In operation, switch 90 is manually moved to bridge the left side contacts to connect the positive side of the battery 92 to terminal 46 and the negative side to terminal 48 thereby causing the armature and the pinion 88 to rotate counterclockwise, as viewed in FIG. 3, to drive the rack section 100 downwardly in the channel 60 until the bumper 107 abuts the housing 31, at which time the motor will stall. The bumper 107 cushions and decelerates the rack section 100 thereby preventing high unit stress loads in the system. The bumpers, 105 and 107 permit the use of plastic materials in the manufacture of the rack section 100. Currently therewith the piston 102 is retracted downwardly and the bellows 106 contracts. Lever 20 is pivoted clockwise raising rod 26 and the button 28 upwardly and allowing the arm 16 to move upwardly in slot 18 and unlock the latch control mechanism.

When it is desired to lock the door latch mechanism, switch 90 is moved to bridge the right hand contacts thereby applying positive voltage to terminal 48 and negative voltage to terminal 46. This causes the armature and the pinion to rotate clockwise driving the rack section 100 upwardly in the channel 60 until the bumper 105 abuts the housing 31 and the motor stalls. The upward movement of the piston 102 pivots the lever 20 counterclockwise thereby retracting the rod 26 and the button 28 and downwardly shifting the arm 16 and the slot 18 to latch the lock control mechanism.

The longitudinal axis of piston rod 102 is perpendicular to the axis of the pinion 88 to prevent side loading thereof. Thus the rack section 100 does not have a tendency to rotate about the axis of pinion 88. This permits the use of the single guide roller 74 to maintain the rack section 100 positioned in the channel 60. The roller 74 absorbs the separating force on the teeth of the rack 112 and pinion 88.

The actuator can be overridden by manual operation of the control mechanism 14. By manually raising the button 28 and thereby causing clockwise pivoting of the lever 22, the output member 11 will be driven downwardly the rack teeth 112 will drive the pinion 88 and armature assembly counterclockwise until further movement is prevented by engagement of the bumper 107 with housing 31. By depressing the button 28 the opposite action occurs so that the rack teeth 112 drive the pinion 88 in the opposite direction until further movement of rack 100 is restrained by the bumper 105.

The subject power door lock actuator provides a compact unitized assembly which can be unit handled and directly attached by means of the bracket 34 to a convenient location of the door panel. Secondary connection to the operating mechanism same is as easily operatively installed in the door. The actuation time for the subject actuator is approximately 1 second during which time the output member is shifted approximately 1 inch to condition the lock assembly.

Obviously, many modifications and variations of the present invention are possible in light of the above teachings. It is, therefore, to be understood that within the scope of the appended claims the invention may be practiced otherwise than as specifically described.

What is claimed is:

1. A linear actuator comprising a housing having a longitudinal cavity therein with an opening at one end thereof; an output member disposed in the cavity for longitudinal movement therewithin between first and second positions including a rod portion having a longitudinal axis and extending outwardly through the opening and adapted to be connected to a member to be actuated; a longitudinal slot in said output member, a rack of gear teeth formed on an inner longitudinal surface defining the slot of the output member; reversible motor means connected to the housing and having an output shaft; a pinion connected to said output shaft and having teeth meshing with the gear teeth of said rack and the axis of rotation of said pinion being perpendicular to and intersecting said longitudinal axis of said rod portion, said motor means and pinion being operative to drive the rack and output member between said first and second positions; single roller means engaging an outer longitudinal surface of the output member opposite said rack and said pinion engagement for maintaining said engagement and for guidably supporting the output member during said movement between said positions; support means mounting said roller means including a post extending through one wall of said housing, an eccentric portion on said post rotatably supporting said roller means, adjustment means on said post for permitting rotation of said post relative to said housing so that said eccentric portion enforces proper meshing of said rack and pinion, and a deformable portion on said post being deformed to secure said post in said housing to prevent rotation of said post after proper meshing is accomplished; and manual means operatively connected to said output member for manually moving said output member between said first and second positions independently of said motor means.

2. A linear actuator comprising: a housing having a longitudinal cavity therein with an opening at one end thereof; an output member slidably disposed in the cavity for longitudinal movement therewithin between first and second positions; a rod on the output member extending outwardly through the opening and adapted to be connected to a member to be actuated; a longitudinal slot in said output member, a rack of gear teeth formed on an inner longitudinal surface defining the slot of the output member; reversible motor means connected to the housing and having an output shaft; a pinion connected to said output shaft and having teeth meshing with the gear teeth of said rack, said motor means and pinion being operative to drive the rack and output member between said first and second positions; single roller means engaging an outer longitudinal surface of the output member opposite said rack and pinion engagement for maintaining said engagement and for guidably supporting the output member during said movement between said positions; support means mounting said roller means including a post extending through one wall of said housing, an eccentric portion on said post rotatably supporting said roller means, adjustment means on said post for permitting rotation of said post relative to said housing so that said eccentric portion enforces proper meshing of said rack and pinion, and a deformable portion on said post being deformed to secure said post in said housing to prevent rotation of said post after proper meshing is accomplished; resilient means encircling said rod at locations internally and externally of said cavity for abutting said housing when said output member has reached said first or second position; and manual means operatively connected to said output member for manually moving said output member between said first and second positions independently of said motor means.

3. A linear actuator comprising: a housing having a longitudinal cavity therein with an opening at one end thereof; an output member slidably disposed in the cavity for longitudinal movement therewithin between first and second positions including a rod portion having a longitudinal axis extending outwardly through the opening and adapted to be connected to a member to be actuated; a longitudinal slot in said output member, a rack of gear teeth formed on an inner longitudinal surface defining the slot of the output member; reversible motor means connected to the housing and having an output shaft; a pinion connected to said output shaft and having teeth meshing with the gear teeth of said rack and the axis of rotation of said pinion being perpendicular to and intersecting said longitudinal axis of said rod portion, said motor means and pinion being operative to drive the rack and output member between said first and second positions; single roller means engaging an outer longitudinal surface of the output member opposite said rack and pinion engagement for maintaining said engagement and for guidably supporting the output member during said movement between said positions; support means mounting said roller means including a post extending through one wall of said housing, an eccentric portion on said post rotatably supporting said roller means, adjustment means on said post for permitting rotation of said post relative to said housing so that said eccentric portion enforces proper meshing of said rack and pinion, and a deformable portion on said post being deformed to secure said post in said housing to prevent rotation of said post after proper meshing is accomplished; resilient means encircling said rod at locations internally and externally of said cavity for abutting said housing when said output member has reached said first or second position; and manual means operatively connected to said output member for manually moving said output member between said first and second positions independently of said motor means.

4. A linear actuator comprising: a housing having a longitudinal cavity therein with an opening at one end thereof; an output member disposed in the cavity for longitudinal movement therewithin between first and second positions including a rod portion having a longitudinal axis and extending outwardly through the opening and adapted to be connected to a member to be actuated; a longitudinal slot in said output member, a rack of gear teeth formed on an inner longitudinal surface defining the slot of the output member; reversible motor means connected to the housing and having an output shaft; a pinion connected to said output shaft and having teeth meshing with the gear teeth of said rack and the axis of rotation of said pinion being perpendicular to and intersecting said longitudinal axis of said rod, said motor means and pinion being operative to drive the rack and output member between said first and second positions; single roller means engaging an outer longitudinal surface of the output member opposite said rack and said pinion engagement; and support means mounting said roller means including a post extending through one wall of said housing, an eccentric portion on said post rotatably supporting said roller means, adjustment means on said post for permitting rotation of said post relative to said housing so that said eccentric portion enforces proper meshing of said rack and pinion, and a deformable portion on said post being deformed to secure said post in said housing to prevent rotation of said post after proper meshing is accomplished.

* * * * *